US007415988B2

(12) United States Patent
Trettin et al.

(10) Patent No.: US 7,415,988 B2
(45) Date of Patent: *Aug. 26, 2008

(54) STORAGE SYSTEM AND PROTECTIVE DEVICE FOR TANKS

(75) Inventors: David J. Trettin, Atlanta, GA (US); Jon Aaron Schlosser, Cumming, GA (US); Mark Allen Catron, Atlanta, GA (US)

(73) Assignee: Irwin Industrial Tool Company, Huntersville, NC (US)

( * ) Notice: Subject to any disclaimer, the term of this patent is extended or adjusted under 35 U.S.C. 154(b) by 246 days.

This patent is subject to a terminal disclaimer.

(21) Appl. No.: 10/906,720

(22) Filed: Mar. 3, 2005

(65) Prior Publication Data

US 2006/0196546 A1 Sep. 7, 2006

(51) Int. Cl.
*B65D 25/20* (2006.01)
*F16K 27/08* (2006.01)

(52) U.S. Cl. .................. 137/355.16; 137/382; 220/724; 248/79; 248/90

(58) Field of Classification Search ................................ 137/355.16–355.28, 382; 220/724, 756; 128/200.24, 200.18; 248/79, 90
See application file for complete search history.

(56) References Cited

U.S. PATENT DOCUMENTS

| | | | | |
|---|---|---|---|---|
| 2,384,174 A | | 9/1945 | Jones | |
| 2,454,934 A | * | 11/1948 | Mathis et al. | 62/48.1 |
| 2,595,156 A | | 4/1952 | Matasovic | |
| 2,803,138 A | | 8/1957 | Strobl | |
| 2,946,223 A | | 7/1960 | Lauer, Jr. | |
| 3,006,360 A | | 10/1961 | Oxenham | |
| 3,150,830 A | * | 9/1964 | Griffith | 239/198 |
| 3,320,812 A | | 5/1967 | Taylor et al. | |
| 3,776,412 A | | 12/1973 | Mink | |
| 3,788,511 A | | 1/1974 | Marsh | |
| 3,906,129 A | | 9/1975 | Damois | |
| 3,958,716 A | | 5/1976 | Korte | |
| 4,109,692 A | * | 8/1978 | Brown | 220/9.1 |
| 4,215,581 A | * | 8/1980 | Bolick et al. | 73/431 |
| 4,332,331 A | | 6/1982 | Fawley | |
| 4,352,370 A | | 10/1982 | Childress | |
| 4,383,528 A | * | 5/1983 | Eppolito | 128/205.22 |
| 4,420,013 A | | 12/1983 | DiBlasio | |

(Continued)

OTHER PUBLICATIONS

International Search Report and Written Opinion, PCT/US06/07008, dated Jan. 28, 2008.

*Primary Examiner*—John Rivell
*Assistant Examiner*—Cloud K Lee
(74) *Attorney, Agent, or Firm*—Dennis J. Williamson; Frederick D. Bailey; Moore & Van Allen, PLLC

(57) ABSTRACT

A tank jacket that has a top portion and a body portion made of a durable flexible material such as nylon is dimensioned to fit over the outside of a storage tank. The top portion includes a hole for receiving the regulator assembly. Specifically, the regulator assembly is removed from the tank, typically by unscrewing the assembly from the tank, and the jacket is fit over the tank so that the hole aligns with the tank's fill/dispense port. The regulator assembly is then reattached to the tank to retain the jacket on the tank. The tank jacket supports a hose support assembly for storing the supply hose and a plurality of pockets for retaining various accessories and tools.

20 Claims, 6 Drawing Sheets

U.S. PATENT DOCUMENTS

| | | | | |
|---|---|---|---|---|
| 4,466,283 | A | 8/1984 | Osterhout | |
| 4,506,853 | A | 3/1985 | Cathey | |
| 4,521,676 | A | 6/1985 | Poulsen | |
| 4,577,511 | A | 3/1986 | Wetzel | |
| 4,600,033 | A * | 7/1986 | Baron | 137/382 |
| 4,676,319 | A * | 6/1987 | Cuthbertson | 169/70 |
| 4,739,913 | A * | 4/1988 | Moore | 224/643 |
| D295,839 | S | 5/1988 | O'Brien et al. | |
| 4,765,472 | A | 8/1988 | Dent | |
| 4,964,529 | A | 10/1990 | Houston | |
| 5,027,478 | A * | 7/1991 | Suhr | 24/16 R |
| 5,058,758 | A | 10/1991 | Suddeth | |
| 5,097,705 | A | 3/1992 | Porter | |
| 5,119,677 | A | 6/1992 | Porter | |
| 5,119,844 | A * | 6/1992 | Cannon et al. | 137/382 |
| 5,253,760 | A | 10/1993 | Miller | |
| 5,259,372 | A * | 11/1993 | Gross et al. | 128/200.24 |
| 5,318,821 | A | 6/1994 | Bradley, Jr. | |
| 5,367,908 | A | 11/1994 | McKenzie | |
| 5,422,152 | A | 6/1995 | Langeland et al. | |
| 5,427,272 | A | 6/1995 | Gaspari | |
| 5,429,152 | A | 7/1995 | Van Straaten et al. | |
| 5,429,265 | A | 7/1995 | Maire et al. | |
| 5,454,492 | A | 10/1995 | Hunter et al. | |
| 5,638,858 | A | 6/1997 | Gettinger et al. | |
| 5,671,503 | A * | 9/1997 | Uebelacker et al. | 16/111.1 |
| 5,713,388 | A | 2/1998 | Brewer | |
| 5,772,066 | A | 6/1998 | Reynolds | |
| 5,797,528 | A | 8/1998 | McDuffie | |
| 5,829,629 | A | 11/1998 | Usher | |
| 5,934,314 | A * | 8/1999 | Spear et al. | 137/355.16 |
| 5,971,200 | A | 10/1999 | Reynolds | |
| D416,822 | S | 11/1999 | Slate et al. | |
| 6,003,744 | A * | 12/1999 | Culjak | 224/148.5 |
| 6,012,411 | A | 1/2000 | Hochbrueckner | |
| 6,086,253 | A * | 7/2000 | Hartsfield | 383/22 |
| 6,092,647 | A * | 7/2000 | Yeh et al. | 206/86 |
| 6,123,187 | A | 9/2000 | Bartels | |
| 6,189,697 | B1 | 2/2001 | Davis | |
| D439,956 | S | 4/2001 | Nilsson | |
| 6,247,491 | B1 | 6/2001 | Petryna | |
| 6,276,579 | B1 | 8/2001 | DeLoach | |
| 6,325,251 | B1 | 12/2001 | Santos | |
| 6,415,946 | B2 | 7/2002 | Carlo et al. | |
| 6,508,282 | B2 | 1/2003 | Garofalo et al. | |
| 6,561,281 | B1 * | 5/2003 | Arnold | 169/46 |
| 6,609,626 | B2 | 8/2003 | Young et al. | |
| 6,655,543 | B2 | 12/2003 | Beuke | |
| 6,976,502 | B1 * | 12/2005 | Bibow et al. | 137/343 |
| 2004/0020793 | A1 | 2/2004 | Peterolff et al. | |

* cited by examiner

STORAGE SYSTEM AND PROTECTIVE DEVICE FOR TANKS

BACKGROUND

The invention relates generally to pressurized liquid or gas storage tanks and more particularly to an improved storage system and protective device for such tanks.

Tanks for storing and dispensing pressurized gas and/or liquid are commonly used in a wide variety of industrial, medical and other applications. A typical tank comprises a hollow cylinder made of steel or other rigid impermeable material that stores the gas or liquid under relatively high pressure. A regulator assembly is in fluid flow communication with the tank and includes a regulator to control the flow of fluid from the tank and a gauge to monitor the fluid level and/or pressure. The tank may be provided with a separate valve for controlling fluid flow from the tank to the regulator assembly. A supply hose is connected to the output port of the regulator assembly for dispensing the fluid. The gauge is relatively fragile and can be damaged or unseated from the regulator assembly if it collides with an object.

Often storage tanks are used in an environment where the fluid stored in the tank is used in conjunction with other equipment for performing a particular function. Example environments are plumbing, welding, HVAC and electrical work where the tank may store a liquid fuel such as acetylene or propane. Such applications require related equipment such as brazing rods, pipe fittings, solder, flux, hand tools, torch heads or the like. Because the typical filled storage tank is heavy and difficult to transport and a wide variety of related equipment may be required at the work site, it has been difficult for a worker to easily and conveniently transport the storage tank and associated equipment.

Thus, an improved storage system and protective device for use with pressurized tanks is desired.

SUMMARY

The storage system of the invention comprises a tank jacket that has a top portion and a body portion made of a durable flexible material such as nylon that is dimensioned to fit over the outside of a storage tank. The top portion includes a hole for receiving the regulator assembly. Specifically, the regulator assembly is removed from the tank, typically by unscrewing the assembly from the tank, and the jacket is fit over the tank so that the hole aligns with the tank's fill/dispense port. The regulator assembly is then reattached to the tank to retain the jacket on the tank. The free edge of the body portion includes an elastic band for fitting the edge of the body portion tightly to the tank. The tank jacket supports a hose support assembly for storing the supply hose and a plurality of pockets for retaining various accessories and tools.

Additionally, a gauge protector may be provided that fits over the regulator assembly. The gauge protector is constructed of a rigid material such as ABS plastic. The gauge protector includes a first housing section defining a first cavity for receiving the regulator and a second housing section defining a second cavity for receiving the pressure gauge. The first and second housing sections provide shock protection for the gauge and regulator. The first and second housing sections are rigidly connected to one another and mounted on the regulator assembly such that a force applied to the gauge is at least partially absorbed by the gauge protector and regulator assembly. As a result the force on the gauge is lessened and the integrity of the connection between the gauge and the regulator is maintained. A handle may be formed on the gauge protector to facilitate carrying of the tank.

The gauge protector and tank jacket may be used independently from one another or may be used together on the same tank. When used together, the gauge protector and tank jacket protect the tank and regulator assembly and provide a system for transporting the tank and related accessories and tools.

DETAILED DESCRIPTION OF EMBODIMENTS OF THE INVENTION

Figure 1:
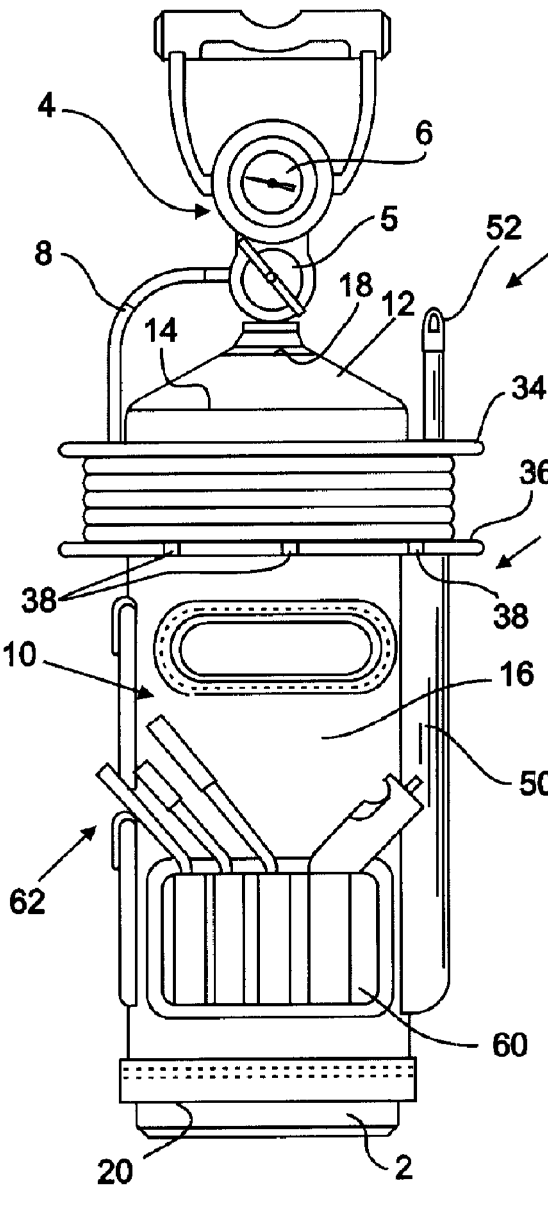
FIG. 1 is a front view of the tank jacket and gauge protector of the invention mounted on a tank.
Figure 2:
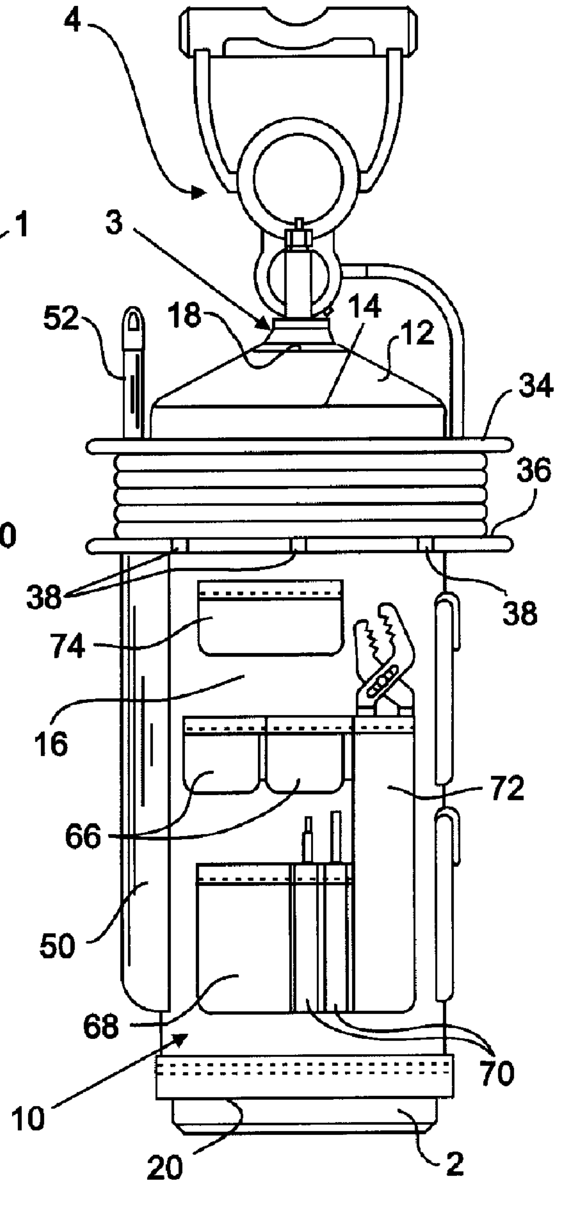
FIG. 2 is a back view of the tank jacket and gauge protector of the invention mounted on a tank.

Referring to FIGS. 1 through 4, the storage system 1 of the invention is shown in use with a storage tank 2 having a fill/dispense port 3 on which is mounted regulator assembly 4. Regulator assembly 4 includes a regulator 5 and gauge 6. A hose 8 is in fluid flow communication with regulator 5 for dispensing the fluid stored in tank 2. While in the illustrated embodiment tank 2 has a substantially cylindrical shape, the storage system of the invention can be used with tanks having any size and shape. Storage system 1 consists of a jacket 10 made of a durable and flexible material such as nylon, cordura, cotton, polyester, leather, denim, other synthetic materials or other materials that provide the necessary durability and flexibility. In one embodiment the material is a flame retardant material. Jacket 10 has a top portion 12 that terminates in a circular rim 14 and defines a centrally located hole 18. Extending from top portion 12 is a body portion 16 that extends around the entire periphery of the top portion so as to create an interior cavity dimensioned to receive tank 2. The bottom free edge 20 of body portion 16 is open such that the tank can be inserted into the cavity formed by body portion 16 and top portion 14 through the bottom of the jacket 10. In use the tank 2 may be stood vertically and the jacket 10 slipped over top of the tank. The shape of top portion 12 is determined by the shape of the tank. In the illustrated embodiment tank 2 is cylindrical and top portion 12 is shaped and sized to match the outer dimension of tank 2 such that the body portion 16 closely fits over the exterior of the tank. If a tank with a different shape is used, the storage system would likewise be shaped to conform to the shape and size of the tank. Likewise, the hole 18 is shown in the center of the top portion 12 to accommodate the centrally located fill/dispense port 3 of tank 2. If the fill/dispense port is located in a different position on a different type of tank, hole 18 would be repositioned so as to be coextensive with the port.

Figure 3:
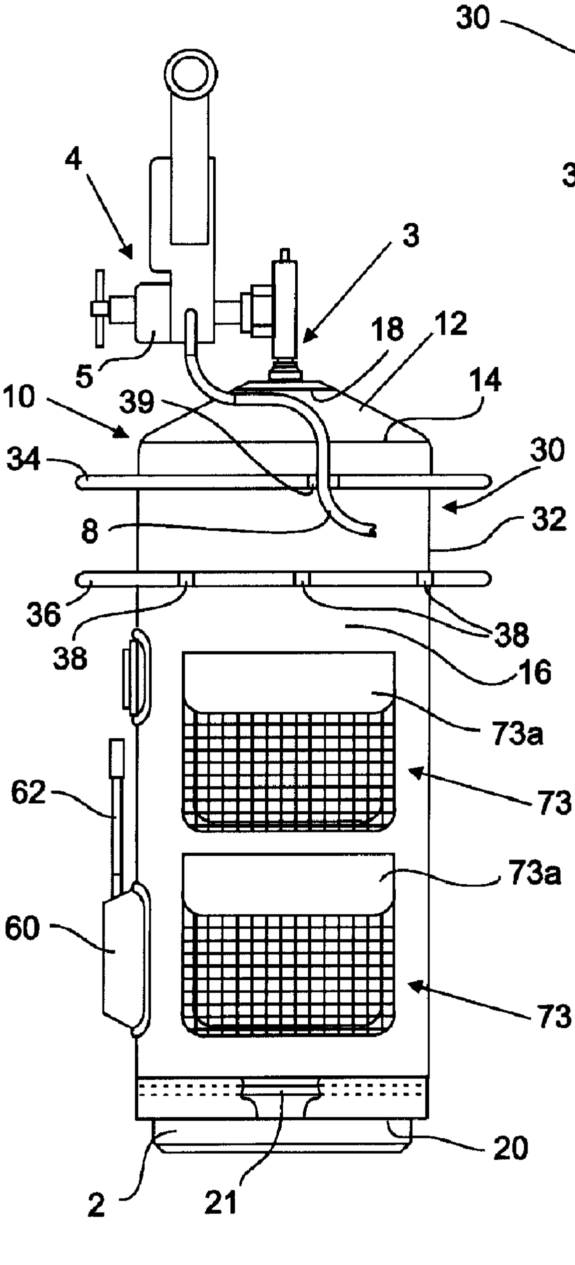
FIG. 3 is a left side view of the tank jacket and gauge protector of the invention mounted on a tank.

Referring to FIG. 3, an elastic band 21 is provided along the free end of body portion 16. Elastic band 21 may be disposed in a pocket or hem formed at the free edge of body portion 16. The elastic band 21 is provided to help retain the jacket on the tank and to conform the free end of the jacket to the exterior surface of the tank. The elastic band 21 also helps to prevent debris or other foreign matter from entering the space between the tank 2 and the jacket 10 and minimizes the chance that the free end of the jacket will be inadvertently snagged.

The jacket 10 supports a hose storage assembly 30 on which the hose 8 is stored when not in use. Hose storage assembly 30 consists of a base member 32 that is connected to the side portion 16 by adhesive, stitching or other suitable fastener. If desired the base 32 may be removably connected to the side portion 16 such as by hook and loop fasteners, snaps or other releaseable fastener. Base 32 is dimensioned so as to have an interior dimension and shape that is substantially the same as the outer dimension of the jacket and that conforms to the outer shape and dimension of the tank 2 such that the base 32 will surround the tank when the storage system 1 is mounted on the tank. Extending from the base is an upper flange 34 and a lower flange 36. Upper flange 34 an lower flange 36 extend from the base a distance sufficient to create a volume of space therebetween that can accommodate the hose when the hose is wound around base 32. Hose 8 extends from the regulator assembly 4 through a hole 39 formed in upper flange 34 and into the space between upper flange 34 and lower flange 36 such that the hose can be wrapped around base 32. The hose storage assembly is arranged such that hose 8 is wrapped around the tank 2. In other words, the axis around which hose 8 is wrapped is coextensive with the longitudinal axis of tank 2. In this manner the hose 8 can be safely and securely stored while minimizing the space the hose occupies in the stored position.

Figure 5:
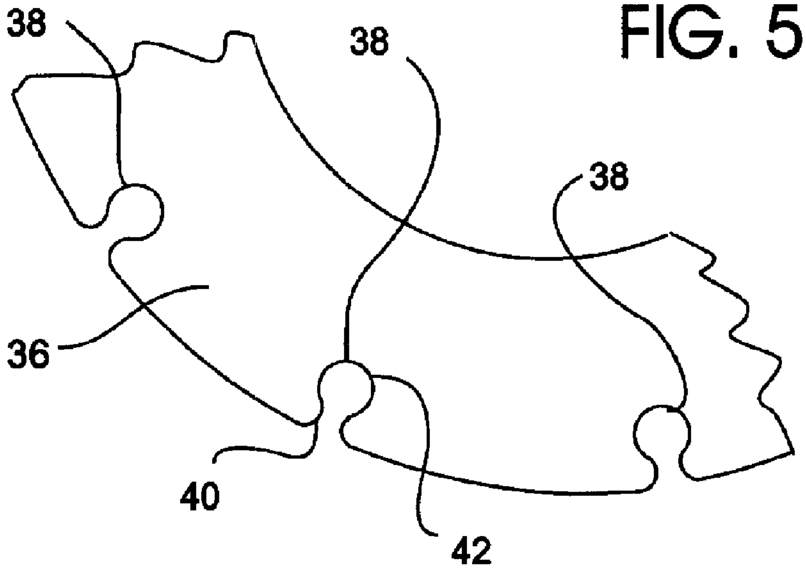
FIG. 5 is a partial plan view of the hose storage assembly used in the tank jacket of the invention.

The bottom flange 36 includes a plurality of notches 38 that extend from the exterior edge of the bottom flange to an interior position. After the hose is wound on reel assembly 30, the free end of the hose can be inserted into one of the notches 38 to prevent the hose from unwinding. Notches are provided spaced around the periphery of bottom flange 36 such that the end of the hose can be secured in a notch regardless of where on the hose storage assembly the free end of the hose is positioned. As best shown in FIG. 5, in one embodiment each notch 38 has a narrow throat portion 40 that leads into a slightly wider receptacle portion 42. The throat portion 40 is dimensioned such that the hose, which is typically constructed of a flexible material, is deformed as it is squeezed through throat portion 40. In this manner the hose will not inadvertently fall out of the notch. The receptacle portion 42 holds the hose without applying continuous pressure on the hose. The throat portion 40 could also be made flexible such as by using a deformable material or a flexible arrangement to facilitate insertion of the hose.

Figure 4:
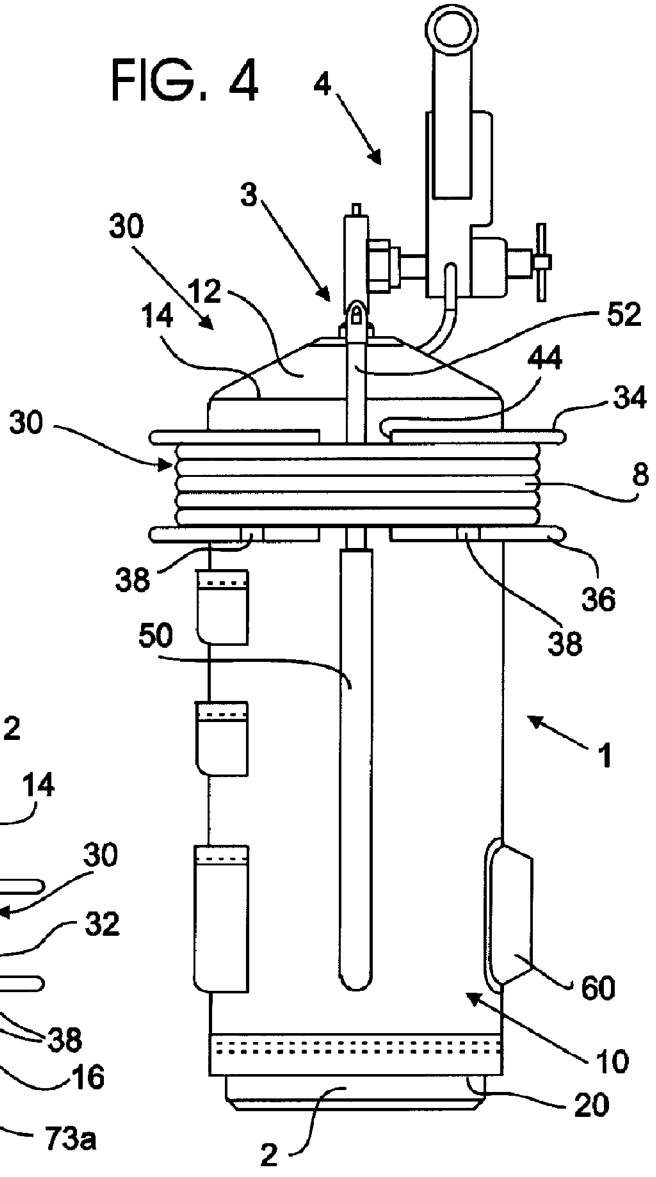
FIG. 4 is a right side view of the tank jacket and gauge protector of the invention mounted on a tank.

In the illustrated embodiment, jacket 10 supports an elongated vertical pocket 50 that may store brazing rods or other elongated articles. In one embodiment pocket 50 may be made of the same material as jacket 10. Brazing rods are typically stored in an elongated plastic container 52 where the rods and storage container, when inserted in the pocket 50 may extend beyond the hose storage assembly 30. To accommodate the brazing rods or other elongated articles, the hose storage assembly is formed with a gap 44 that allows the elongated article to extend beyond the hose storage assembly if necessary as shown in FIG. 4. In the illustrated embodiment the gap is formed by making the hose storage assembly of a single piece that does not form a completely closed circle, i.e. the hose storage assembly has a "C" shape in plan view. Alternatively the reel assembly could be formed of two separate pieces that when secured on the body will not completely circumscribe the periphery of the jacket 10 to create gap 44. Moreover, the hose storage assembly could completely circumscribe the periphery of jacket 10 and gap 44 be provided by aligned apertures in the top and bottom flanges 34 and 36 that allow passage of an elongated article stored in pocket 50. In operation, if an elongated article is stored in pocket 50, the hose 8 will wrap around the outside of the stored article when the hose is in the stored position as shown in the Figures.

In addition to pocket 50 other storage compartments may be provided on body 10 to facilitate the storage and transport of tools, accessories, equipment or the like. A plurality of vertical pockets 60 may be provided on the front of jacket 10. Pockets 60 are formed of a single piece of molded plastic formed to conform to the shape of the side portion 14. The molded plastic pockets provide durable receptacles for tools such as torch heads 62. Located on one side of the jacket 10 are a plurality of pockets sized and configured to retain tools and accessories used by a worker. For example pockets 66 may be used to store solder, pocket 68 may store flux, pockets 70 may store markers, pocket 72 may store channel pliers and pocket 74 may store pipe cutters. The opposite side of jacket 10 may include mesh bags 73 with closing flaps 73*a* that are held shut by hook and loop fasteners or other releaseable fastener. The mesh bags may retain accessories such as pipe fittings or the like. Other pockets may be provided on the opposite side for retaining a striker and/or additional brazing rods. The pockets and other storage compartments may be permanently secured to the jacket such as by adhesive, rivets, or stitching or they may be releasably secured to the jacket such as by hook and loop fasteners, snaps or the like.

Figure 6:
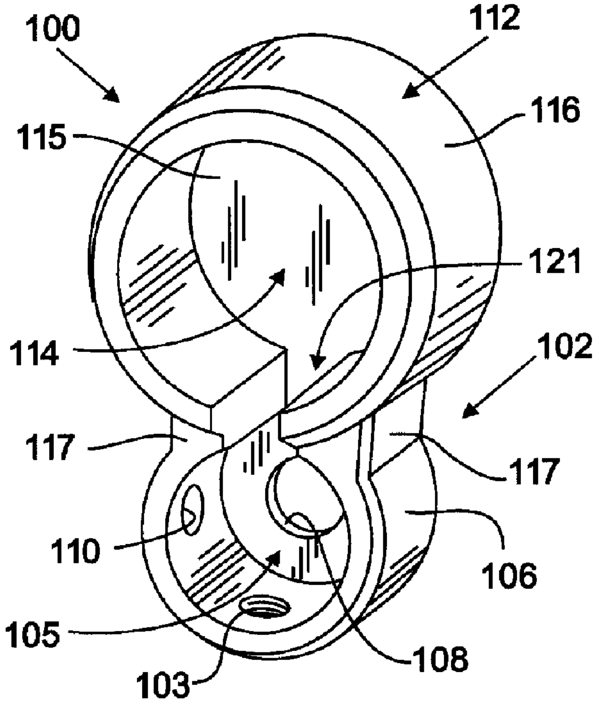
FIG. 6 is a perspective view of one embodiment of the gauge protector of the invention.

Referring to FIG. 6, the illustrated embodiment of the gauge protector 100 of the invention comprises an integral, unitary structure molded of ABS plastic or other rigid material. The gauge protector 100 may also be made of other rigid materials such as steel and need not be an integral structure as the various elements of the gauge protector could be manufactured separately and assembled to create a unitary structure. In the illustrated embodiment, gauge protector 100 includes a first housing section 102 having a back wall 104 and a side wall 106 extending from back wall 104 to create cavity 105. Back wall 104 defines an aperture 108 for receiving the conduit of regulator and side wall 106 defines an aperture 110 for receiving hose. A threaded hole 103 is formed in side wall 106 for receiving a threaded securing member such as a bolt as will hereinafter be described. Gauge protector 100 includes a second housing section 112 that has a circular back wall 115 and an annular wall 116 extending from back wall 115 to define cavity 114 for closely receiving gauge 6. First housing section 102 and second housing section 112 are rigidly connected by portions 117 such that a passage 121 extends between cavity 105 and cavity 114.

Figure 7:
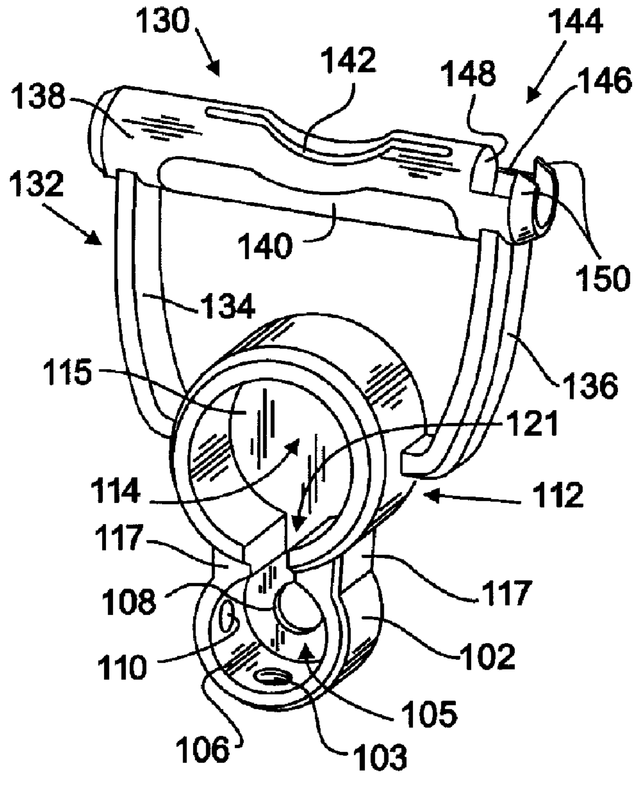
FIG. 7 is a perspective view of another embodiment of the gauge protector of the invention.

Referring to FIG. 7 another embodiment of the gauge protector is shown generally at 130. Gauge protector 130 is the same as gauge protector 100 except that handle 132 is provided on the gauge protector to facilitate the carrying of the tank. The same reference numerals are used in FIG. 7 as are used in FIG. 6 to identify the same elements as previously described with reference to FIG. 6. Handle 132 includes support members 134 and 136 that connect the second housing section 112 to the hand grip 138. Hand grip 138 is a rigid structure that can be gripped by a person to carry tank 2. A soft cushion 140 may be molded in the hand grip 138 to enhance the comfort of the grip. A slotted recess forming compartment 142 may be provided in hand grip 138 to retain the tank key. Portion 144 of hand grip 138 can be used to hold a torch head handle. Specifically, portion 144 consists of a recessed area 146 bounded by hand grip portion 148 and prongs 150. The torch head handle can be hung on recessed area 146 for convenient temporary storage when the tank is in use.

Figure 8:
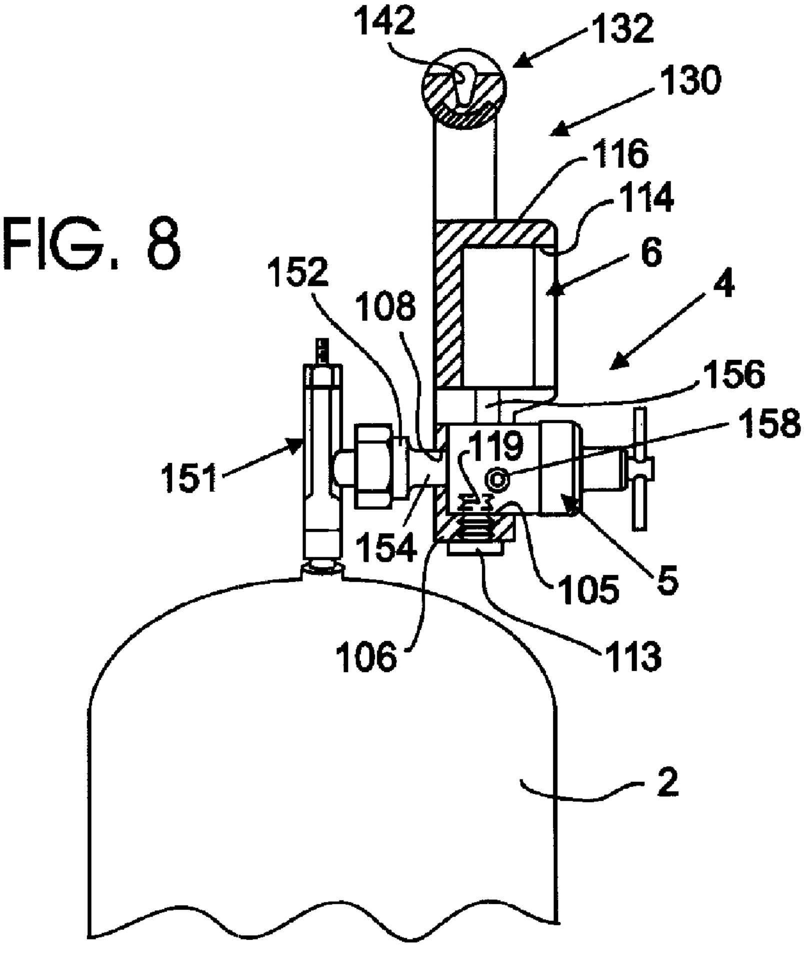
FIG. 8 is a section view of the gauge protector of FIG. 7 mounted on a regulator assembly.

FIG. 8 shows how gauge protector 130 is mounted on the regulator assembly 4. To install gauge protector 130 on regulator assembly 4, regulator assembly 4 is removed from valve stem 151 at locking nut 152. Regulator assemble 4 is inserted into the front of gauge protector 130 such that conduit 154 is inserted into aperture 108 until regulator 5 is received in cavity 105 and gauge 6 is received in cavity 114. Side wall 106 engages and closely surrounds the regulator 5 and side wall 116 engages and closely surrounds gauge 6. Conduit 156 that connects the regulator 5 to gauge 6 is closely received between portions 117 in passage 121. Side wall 116 is dimensioned such that it extends beyond the front face and back side of gauge 6. Once the regulator assembly is retained in gauge protector 130, the regulator assembly is reattached to valve stem 151 using locking nut 152. A threaded member such as bolt 113 is threadably engaged with threaded hole 103 and engages regulator 5 to retain the gauge protector 130 on regulator assembly 130. In one embodiment threaded member 113 threadably engages a threaded hole 119 formed in regulator 5. In another embodiment the threaded member 113 may simply engage the outer surface of regulator 5 to retain the gauge protector 130 on regulator assembly 4 under the pressure of threaded member 113 against the regulator assembly 4. Aperture 110 is aligned with the port 158 on regulator 5 for receiving hose 8 such that hose 8 can be inserted through aperture 110 and connected to port 158. After the gauge protector 130 is mounted on regulator assembly 4, tank 2 can be easily carried using handle 132.

Gauge protector 100 minimizes damage to the gauge. Specifically, gauge protector minimizes the liklihood that a blow to the gauge will cause the gauge to become unseated from the regulator or otherwise damaged. Side wall 116 and side wall 106 are shaped and dimensioned to closely fit over and surround regulator 5 and gauge 6 such that gauge protector provides shock protection for the gauge itself and adds structural rigidity between the gauge and the regulator to minimize the possibility that the gauge will become unseated from the regulator. The interface between the hose 8 and aperture 110, the interface between conduit 156 and portions 117 and the friction fit between regulator 5 and sidewalls 106 and the engagement of threaded member 113 with regulator assembly 4 prevent the gauge protector from moving. As a result a collision with the gauge will be absorbed at least in part by the gauge protector and elements of the regulator. This minimizes the chance that the gauge 6 will become unseated from the regulator 5. It is to be understood that some regulator assemblies may have shapes that differ somewhat from the illustrated regulator assembly. In such a case the specific shape and configuration of the gauge protector will change to accommodate the size and shape of the regulator assembly and gauge. The gauge protector should be arranged such that it surrounds the regulator and gauge and provides structural rigidity between these components.

Figure 9:
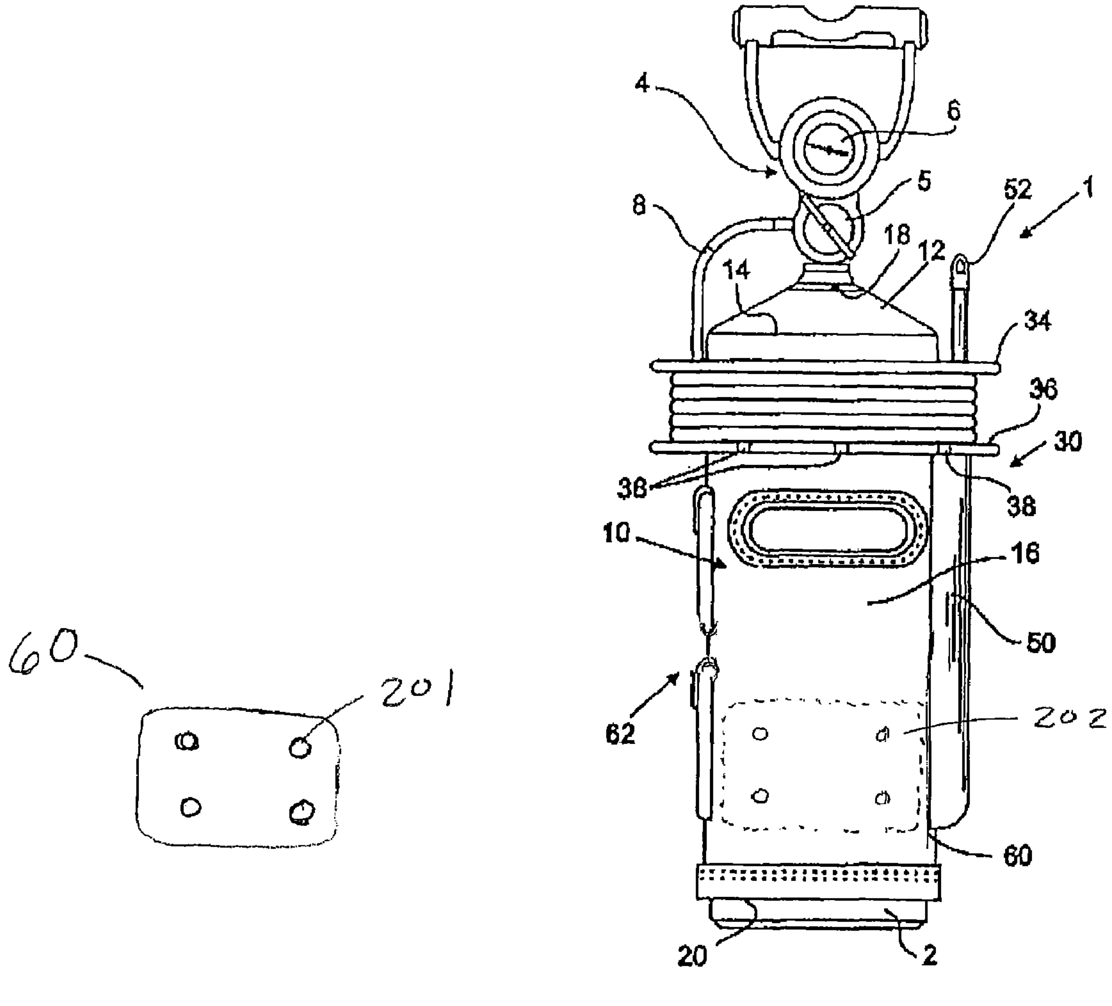
FIG. 9 shows a diagram illustrating a releasable pocket according to an example embodiment of the present invention.
Figure 10:
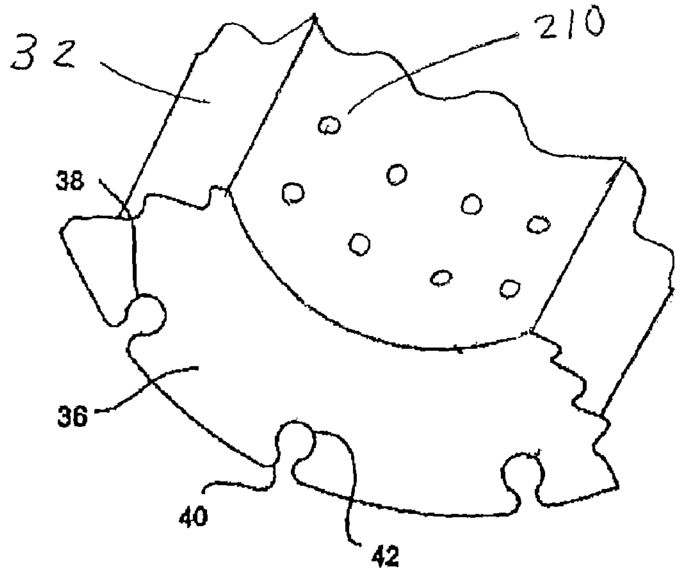
FIG. 10 shows a diagram illustrating a releasable hose storage assembly according to an example embodiment of the present invention.
Figure 10:
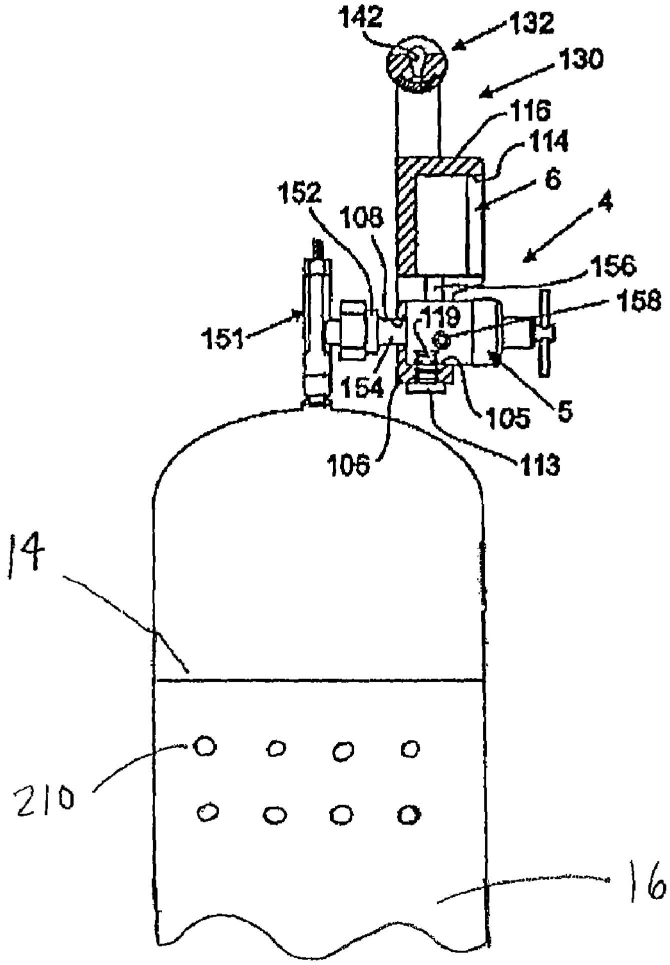

The gauge protectors 130 and 100 may be used with or without jacket storage system 1. Likewise storage system 1 may be used with or without gauge protectors 130 or 100. In the embodiment shown in FIGS. 1 through 4 gauge protector 130 is used with storage system 1. Using gauge protector 130 and storage system 1 on the same tank provides a simple apparatus for carrying a tank and its assorted accessories and related tools while providing protection for the gauge and tank. Associated accessories can be stored in the storage compartments provided on jacket 10 and the tank and the stored accessories can be conveniently carried using handle 132. FIG. 9 shows a diagram illustrating a releasable pocket according to an example embodiment of the present invention. As noted previously, a plurality of pockets 60 may be provided on the jacket 10. These pockets 60 may be releasably attached to the jacket 10. An example back side of a single pocket of the plurality of pockets 60 is shown that attaches to the jacket 10. The single pocket 60 includes snaps 201 providing a snap connection to corresponding portions 202 on the jacket 10. This allows the plurality of pockets 60 to be releasably attached to the jacket 10. In this example embodiment, only four snap connections are shown, however embodiments of the present invention are not limited to this number of snap connections. Further, although not shown, as noted previously the plurality of pockets 60 may also be releasably attached to the jacket 10 by other releasable methods, e.g., adhesive, rivets, stitching, hook and loop fasteners, etc. FIG. 10 shows a diagram illustrating a releasable hose storage assembly according to an example embodiment of the present invention. As noted previously, the base member 32 of the hose storage assembly 30 may be removably connected to the body portion 16. In this example embodiment, the base member 32 of the hose storage assembly 30 may be removably connected to the body portion 16 by snaps 210. In this example embodiment, only four snaps are shown, however, embodiments of the present invention are not limited to this number of snap connections. Further, although not shown, as noted previously, the base member 32 of the hose storage assembly 30 may be removably connected to the body portion 16 by other releasable methods, e.g., adhesive, hooks, loop fasteners, etc.

The system of the invention facilitates the storage and transport of accessories and tools used with a compressed fluid storage tank and provides protection for the gauge and tank. While embodiments of the invention are disclosed herein, various changes and modifications can be made without departing from the spirit and scope of the invention. The scope of the invention is indicated in the appended claims, and all changes that come within the meaning and range of equivalents are intended to be embraced therein.

What is claimed is:

1. A storage system for use with a tank having a regulator assembly and a hose comprising:

a flexible jacket having a body portion dimension to fit over the storage tank and closely fit an exterior of the storage tank, the flexible jacket configured to allow access to the regulator assembly and operational use of the storage tank, the body portion having an open free bottom edge;

an elastic band, the elastic band being provided along the open free bottom edge of the body portion to conform the flexible jacket to an exterior surface of the tank;

a hose storage assembly fixed to the body portion for storing a wound hose, the hose assembly comprising a base that surrounds the tank when the storage system is mounted on the tank, a first flange and a second flange extending from the base a distance sufficient to create a space between the first flange and the second flange to retain the hose in the wound state;

a first pocket carried by the body portion, the first pocket being configured for storing accessories and tools; and a second pocket attached to the body, the second pocket being configured for storing at least one elongated brazing rod, the hose storage assembly containing a gap allowing the elongated brazing rod stored in the second pocket to extend beyond the hose storage assembly, wherein the tank is configured for operational discharging of a contents of the tank while the flexible jacket is fitted over the tank, the flexible jacket fitted over the tank configured to allow the transporting of the tank and the accessories and tools and the at least one elongated brazing rod together.

2. The storage system of claim 1 wherein said flexible jacket body portion substantially covers the tank.

3. The storage system of claim 1 wherein the flexible jacket further comprises a top portion defining a hole, said top portion covering the top of the tank, the body portion substantially covering the sides of the tank, said body portion terminating in a free end for receiving the tank.

4. The storage system of claim 3 wherein the free end includes a member for securing the body portion to the tank.

5. The storage system of claim 1 wherein the hose storage assembly is disposed such that the wound hose surrounds the tank.

6. The storage system of claim 1 wherein the first flange includes a means for retaining the hose on the hose storage assembly.

7. The storage system of claim 1 wherein the first flange includes a notch for receiving an end of the hose to prevent the hose from unwinding.

8. The storage system of claim 1 wherein the first flange includes a plurality of notches for receiving an end of the hose disposed around the periphery of the first flange to prevent the hose from unwinding.

9. The storage system of claim 1 wherein said gap provides the capability to receive other types of elongated articles carried by the storage assembly.

10. The storage system of claim 9 wherein the hose surrounds the elongated article in the wound state.

11. The storage system of claim 1 wherein the body is formed of nylon.

12. The storage system of claim 1 further including a plurality of pockets.

13. The storage system of claim 1 wherein the pocket is formed of molded plastic secured to the body.

14. The storage system of claim 1 wherein the pocket is releasably attached to the body.

15. The storage system of claim 1 wherein the hose storage assembly is releasably attached to the body.

16. The storage system of claim 1 further including a hole formed in the flexible jacket, the hole being aligned with a fill/dispense port of the tank when the flexible jacket is fit over the storage tank.

17. The storage system according to claim 1, wherein the tools comprises pliers.

18. The storage system according to claim 1, wherein the tools comprises pipe cutters.

19. The storage system according to claim 1, wherein the accessories comprises solder.

20. The storage system according to claim 1, wherein the accessories comprises flux.

* * * * *